(No Model.)
W. S. CARRELL.
COW YOKE.
No. 504,299. Patented Aug. 29, 1893.
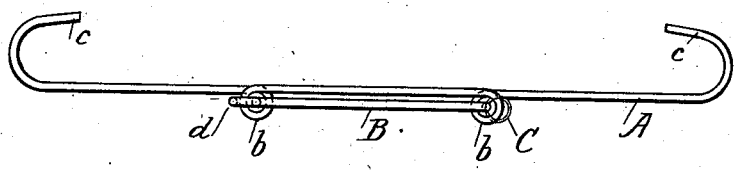
FIG_1_
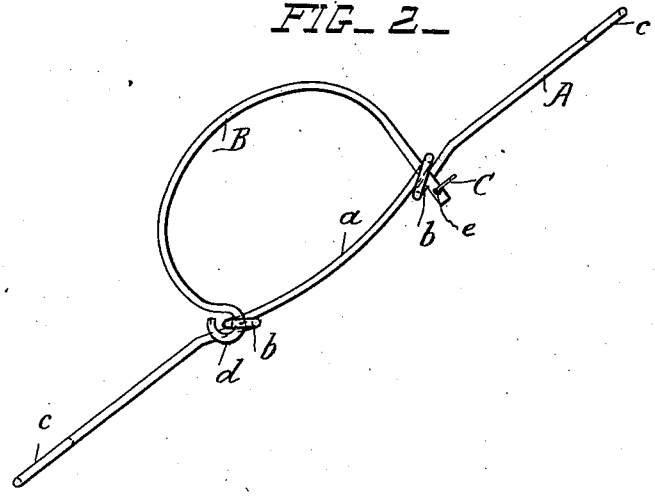
FIG_2_
WITNESSES:
Jno. F. Doran Jr.
George H. Elise Jr.
INVENTOR
William S. Carrell.
BY
Herbert W. T. Jenner
ATTORNEY.

United States Patent Office.

WILLIAM SAMUEL CARRELL, OF CHOCTAW CITY, OKLAHOMA TERRITORY, ASSIGNOR OF ONE-HALF TO DAVID L. HORN, OF SAME PLACE.

COW-YOKE.

SPECIFICATION forming part of Letters Patent No. 504,299, dated August 29, 1893.

Application filed June 20, 1893. Serial No. 478,222. (No model.)

*To all whom it may concern:*

Be it known that I, WILLIAM SAMUEL CARRELL, a citizen of the United States, residing at Choctaw City, in the county of Oklahoma, Oklahoma Territory, have invented certain new and useful Improvements in Cow-Yokes; and I do hereby declare the following to be a full, clear, and exact description of the invention, such as will enable others skilled in the art to which it appertains to make and use the same.

This invention relates to devices adapted to be attached to the necks of animals, such as cows, to prevent them from pushing their way through fences, and more particularly through wire fences.

This invention consists in the novel construction and combination of the parts hereinafter fully described and claimed.

In the drawings: Figure 1 is a plan view of the yoke, from above. Fig. 2 is a front view of the yoke showing it in the position in which it hangs on the neck of the animal.

A is a bar or rod of metal having a slightly curved central portion $a$, and eyes $b$ at equal distances from its center. These eyes are preferably formed by bending the bar into loops. The ends of the bar are provided with hooks $c$.

B is the neck-piece, substantially semi-circular in form. One end of this neck-piece is provided with an eye $d$ which engages with one of the eyes $b$. The other end of the neck-piece is passed through the other eye $b$.

C is a split ring which is slipped through the hole $e$ in the end of the neck-piece beyond the eye through which it is passed, to prevent it from slipping back through the eye.

The yoke is secured about the neck of the animal. One end of the bar rests on the ground and the other is in the air. When the animal attempts to force its way through a fence, or attempts to cross a fence that has been broken down, the hook which rests on the ground catches the lowest wire or rail and stops the animal.

What I claim is—

1. In a cow yoke, the combination, with the bar provided with a hook at each end and an eye on each side of its central portion, of a substantially semi-circular neck-piece pivoted to one of the said eyes, passing through the other said eye and provided with means for securing it, substantially as set forth.

2. In a cow yoke, the combination, with the bar provided with a hook at each end and an eye consisting of a loop in the bar on each side of its central portion, of the substantially semi-circular neck-piece provided with an eye at one end engaging with one of the aforesaid eyes and having its free end passed through the other eye, and a split ring passing through a hole in the free end of the said neck-piece, substantially as and for the purpose set forth.

In testimony whereof I affix my signature in presence of two witnesses.

WILLIAM SAMUEL CARRELL.

Witnesses:
J. S. MUZZY,
J. G. TAYLOR.